A. G. SCHERER.
SAFETY DEVICE FOR CLUTCH CONTROLLED MACHINES.
APPLICATION FILED FEB. 10, 1913.
1,102,609.
Patented July 7, 1914.
2 SHEETS—SHEET 1.
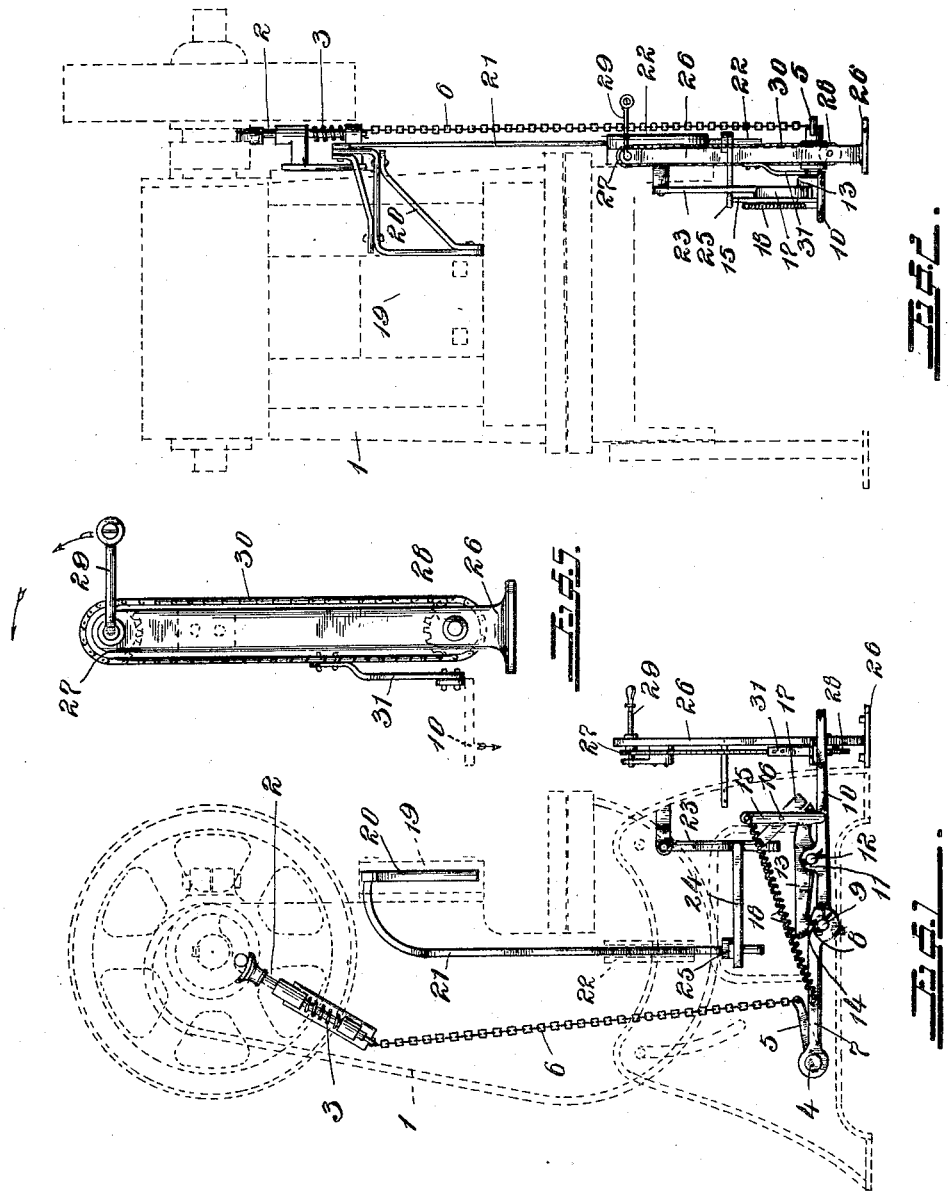

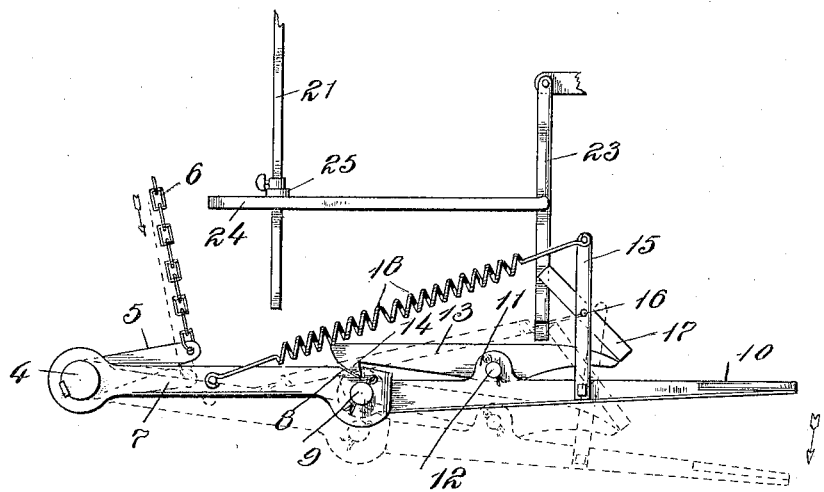
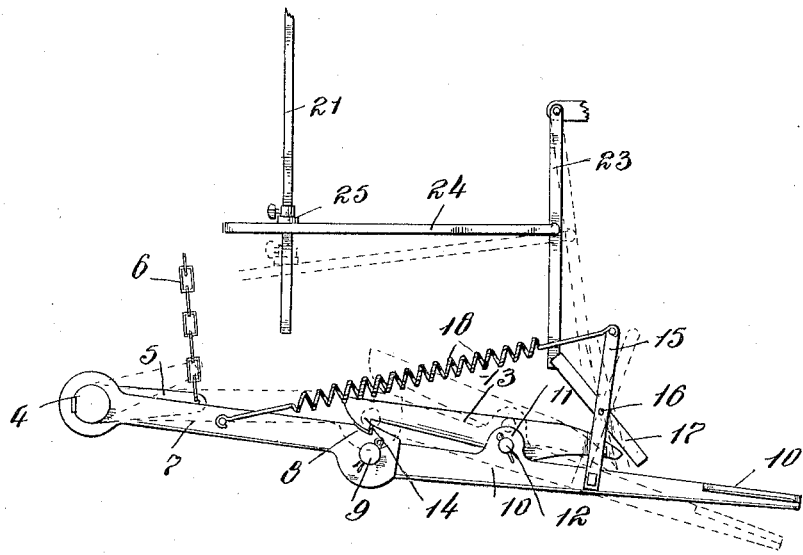

UNITED STATES PATENT OFFICE.

ALBERT G. SCHERER, OF CHICAGO, ILLINOIS, ASSIGNOR TO THE EXCELSIOR STEEL FURNACE COMPANY, OF CHICAGO, ILLINOIS, A CORPORATION OF ILLINOIS.

SAFETY DEVICE FOR CLUTCH-CONTROLLED MACHINES.

1,102,609.   Specification of Letters Patent.   Patented July 7, 1914.

Application filed February 10, 1913. Serial No. 747,290.

*To all whom it may concern:*

Be it known that I, ALBERT G. SCHERER, a citizen of the United States, and a resident of Chicago, in the county of Cook and State of Illinois, have invented a new and useful Safety Device for Clutch-Controlled Machines, of which the following is a specification.

My present invention has special relation to machines such as punch presses, printing presses and forming presses, and the like, in which the power is communicated to the machine by means of a clutch. It is the usual practice to provide such a machine with a clutch so that by the operation of the clutch the machine may be caused to operate when desired and may be thrown out of operation when it is not required. In such machines by far the greater number of accidents which happen in their operation arise from the fact that the clutch is not relinquished in time and the operation of the machine is repeated thereby catching the hand or other portion of the operator.

The object of my present invention is to provide mechanism whereby an unintentional repetition of the operation of the machine will be prevented. To effectuate the above object I have provided the mechanism illustrated in the accompanying drawings, in which:

Figure 1 shows a side elevation of a punch press in dotted lines, and the clutch and safety device for moving the clutch in full lines; Fig. 2 is an elevation of the structure shown in Fig. 1 from the operator's side of the machine; Fig. 3 is an enlarged detail of the treadle portion of the safety device, showing the mechanism, before it has been depressed, in full lines, and after it has been depressed, in dotted lines; Fig. 4 is a view similar to Fig. 3 showing the pedal, after it has been depressed, in full lines, and after it has been broken, in dotted lines, and Fig. 5 is a side elevation of an attachment for operating the safety treadle by hand instead of by foot.

Similar reference characters refer to similar parts throughout the several views.

Various forms of clutch may be employed, but with such machines, so far as I am aware, it is the usual practice to provide a spring which will throw the clutch out of operation when the regular control lever or treadle is not operated.

In Figs. 1 and 2, the dotted portion thereof, designated by the reference character 1, shows a punch press which is provided with a usual form of plunger 2, actuated by a spring 3 to throw the clutch out of operation. In the lower part of the frame of the press is journaled a rotatable rod or shaft 4, to which is keyed an arm 5, from the end of which to the clutch disengaging plunger 2 runs the control chain 6. Also keyed to the rotatable rod 4, and extending toward the operator's side of the press in a substantially horizontal position, is the member 7 of the two part treadle used in my safety mechanism. In the upper side of the member 7, near its unattached end is a depression 8, to be engaged by a catch hereafter to be described. Mounted in the unattached end of the member 7 is a pintle 9 upon which is pivoted the forward member 10 of the treadle for the safety device. Adjacent the pivoted end of the member 10 is a bearing 11 which carries a pintle 12 upon which is pivoted the catch arm 13 upon the rear end of which is a catch 14 to engage the depression 8 heretofore mentioned. Arising from the member 10, forwardly of the bearing 11, and at substantially right angles, is a standard 15, upon which is pivoted, by means of a pivot 16, an arm 17, the lower end of which is adapted to contact with and depress the forward end of the arm 13, thereby disengaging the catch 14 from the depression 8. A spring 18 is secured between the top of the standard 15 and the member 7 so as to cause the treadle to be straightened out and the catch 14 to engage with the depression 8 after the same has been broken and disengaged as hereafter described.

In the dotted view of the punch press the downwardly moving punch member is designated by the reference numeral 19 and to the side of this I secure a suitable bracket 20 which extends outwardly to the side of the machine. Secured to the bracket 20 is a rod 21, slidably mounted in a suitable bearing 22, upon the side of the punch press. Pivoted to the forward side portion of the punch press is a depending lever arm 23, the lower end of which extends into operative relation with the top of the arm 17, and extending rearwardly from the depending lever arm 23 is a rigidly secured extension 24, the rear end of which extends adjacent to the lower end of the rod 21.

The operation of the device is as follows: When the operator desires to cause the machine to act he steps upon the forward end of the member 10 which, by reason of the member 13, engaging the member 7, causes the rotation of the shaft 4. This rotates the arm 5, and through the chain 6, withdraws the clutch disengaging plunger 2, and permits the clutch to engage and the machine to work. As the punch portion of the punch press descends it carries down with it, through the bracket 20, the rod 21, the lower end of which strikes the rearward extension 24 of the lever arm 23, thereby depressing the extension and swinging the lever arm 23 forward upon its pivot. The lever arm 23 strikes the arm 17, thereby depressing the forward end of the member 13 and causing the disengagement of the catch 14 from the depression 7. The lever, comprising the members 7 and 10, is thereby broken and bends upward in the center and the spring 3 is permitted to operate the clutch disengaging plunger 2 which throws out the clutch and prevents a repeat operation. When the operator removes his foot from the member 10 the spring 18 pulls it up so that the catch 14 again engages with the depression 8 and the treadle is then in condition to again withdraw the clutch disengaging plunger. It is often desirable to control these machines by hand, and, for this purpose, I have provided the mechanism shown in detail in Fig. 5 which consists of a standard 26 designed to be bolted to the floor adjacent to the forward end of the treadle member 10. In the top and near the bottom of the standard 26 are mounted sprocket wheels 27—28, the sprocket wheel 27 being provided with a crank 29, so that it may be rotated. About the sprocket wheels 27 and 28 is provided a sprocket chain 30, to which is secured so as to extend to and engage with the treadle 10, an arm or link 31. It will now be seen that the treadle may be depressed either by stepping upon it or by rotating the crank 29 by hand.

It will now be evident, from the description in connection with the drawings, that I have provided a simple and positively acting device for preventing the unintentional repetition of the operation of clutch controlled machines.

Having described my invention, what I claim as new and desire to secure by Letters Patent, is:—

1. In combination with a clutch controlled machine, a treadle of two parts pivoted at one end and hinged at the center, a catch for maintaining the two parts of the treadle in alinement, a lever for disengaging said catch, and a detent carried by the moving part of said machine for actuating said lever whereby said treadle will be broken at each operation of said machine.

2. In combination with a clutch controlled machine, a clutch disengaging member, a spring for operating said clutch disengaging member, a treadle for moving said clutch disengaging member against the action of said spring, said treadle comprising two members pivoted to each other, and a catch for holding said members in operative relation, and means for disengaging said catch so as to permit said spring to operate said clutch disengaging member, and a detent carried by the moving part of said machine for actuating said catch disengaging means.

3. In combination with a clutch controlled machine, a treadle arm for controlling the clutch, comprising two pivoted members and a catch for holding said members in operative relation, a rod secured to a moving part of said machine, and a lever arm co-acting with said rod for disengaging said catch.

4. A safety treadle for controlling clutch operated machines, comprising two parts, a pivotal connection between said parts, a catch pivoted to one of said parts and engaging the other of said parts so as to engage said parts in operative relation, a lever adapted to be secured to said machine for disengaging said catch, and means operable by the motion of said machine for actuating said last mentioned lever.

In testimony whereof, I have hereunto set my hand in the presence of two witnesses.

ALBERT G. SCHERER.

Witnesses:
BENJ. T. ROODHOUSE,
G. W. HILTABRAND.

---

Copies of this patent may be obtained for five cents each, by addressing the "Commissioner of Patents, Washington, D. C."